US012718222B2

(12) United States Patent
Trummer et al.

(10) Patent No.: US 12,718,222 B2
(45) Date of Patent: Aug. 25, 2026

(54) SECURE DATA SCRAPING APPARATUS AND METHOD

(71) Applicant: iCashe, Inc., Portland, OR (US)

(72) Inventors: Christian M. Trummer, Portland, OR (US); Liam P. Johnston, Portland, OR (US); Siva G. Narendra, Portland, OR (US)

(73) Assignee: iCashe, Inc., Portland, OR (US)

( * ) Notice: Subject to any disclaimer, the term of this patent is extended or adjusted under 35 U.S.C. 154(b) by 97 days.

(21) Appl. No.: 18/181,949

(22) Filed: Mar. 10, 2023

(65) Prior Publication Data

US 2024/0303624 A1 Sep. 12, 2024

(51) Int. Cl.

| | |
|---|---|
| ***G06Q 20/38*** | (2012.01) |
| ***G06Q 20/10*** | (2012.01) |
| ***G06Q 20/32*** | (2012.01) |
| ***G06Q 20/40*** | (2012.01) |
| ***H04L 9/40*** | (2022.01) |

(52) U.S. Cl.
CPC ....... *G06Q 20/3223* (2013.01); *G06Q 20/108* (2013.01); *H04L 63/0861* (2013.01)

(58) Field of Classification Search
CPC ........ G06Q 20/3223; G06Q 20/00–425; H04L 63/00–308
USPC .......................................................... 705/64
See application file for complete search history.

(56) References Cited

U.S. PATENT DOCUMENTS 10,510,082 B1 * 12/2019 Zimmerman ........ G06Q 20/108
12,361,213 B2 * 7/2025 Jin ......................... G06N 3/044
2013/0060620 A1 * 3/2013 Davis ..................... G06Q 30/00 705/14.23
2021/0335366 A1 * 10/2021 Keiter .................... G06N 3/094
2023/0153792 A1 * 5/2023 Kurani ................. G06Q 20/354 705/76
2023/0419310 A1 * 12/2023 Pillai ...................... G06Q 20/12

FOREIGN PATENT DOCUMENTS

KR 20140028789 A * 3/2014 ............ G06Q 50/10

* cited by examiner

*Primary Examiner* — Chenyuh Kuo
(74) *Attorney, Agent, or Firm* — MUGHAL GAUDRY & FRANKLIN PC

(57) ABSTRACT

A mobile device is described with apparatus and software for fast and secure access to banking information. In at least one embodiment, a mobile device comprises an antenna; and one or more circuitries coupled to the antenna, wherein the one or more circuitries are to execute instructions to receive account information for a user directly from a financial institution based at least in part on direct interaction with the financial institution without having a device, which is not the mobile device, interact with the financial institution to gather the account information.

18 Claims, 5 Drawing Sheets

SECURE DATA SCRAPING APPARATUS AND METHOD

TECHNICAL FIELD

This application generally relates to computing devices that provide secure interaction with a financial institution. More specifically, this application relates to a method and apparatus for scraping banking account information from a set of financial institutions that follow a variety of account-linking mechanisms.

BACKGROUND

As mobile communication devices are commonly used in day-to-day activities, security of transactions associated with these mobile communication devices is paramount. Users of mobile devices can access their bank or credit card institutions, herein financial institutions, using their mobile devices. To access a financial institution, a user may access an application which uses a third-party server as intermediary between the users' mobile device and the financial institution (e.g., bank). Some financial institutions may not allow interaction with a third-party server to protect a user's account information from being stolen. In some cases, financial institutions may not provide necessary account information to a third-party server to allow downstream applications on a user's mobile device to use. In such cases, it is challenging for downstream applications to provide payment mechanisms for a user because necessary account information may not be available.

The background description provided here is for the purpose of generally presenting the context of the disclosure. Unless otherwise indicated here, the material described in this section is not prior art to the claims in this application and are not admitted to be prior art by inclusion in this section.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
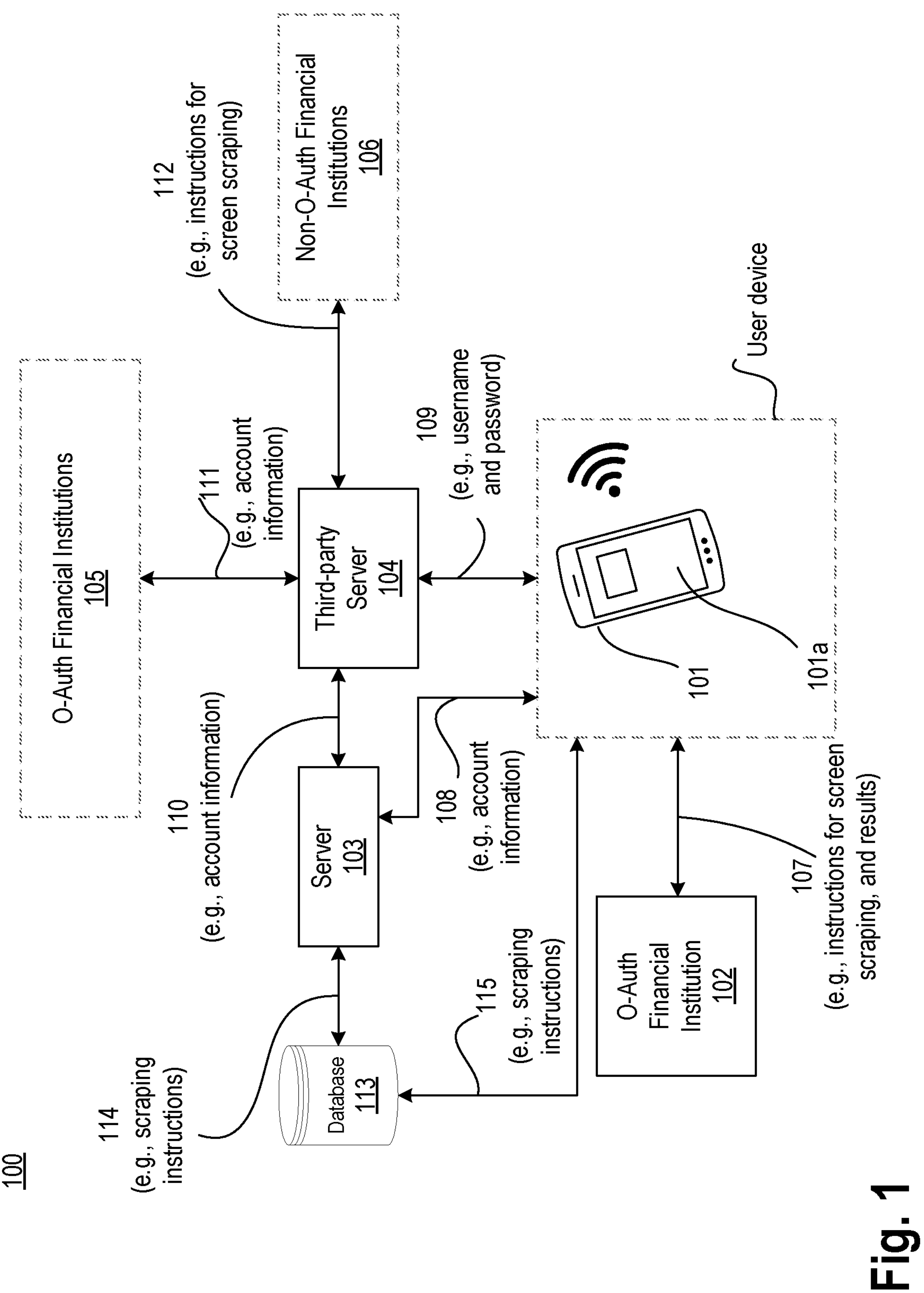
FIG. 1 illustrates a secure banking scraping system, in accordance with at least one embodiment.

At least one embodiment describes a method and apparatus (and/or system) for secure mobile scraping. In at least one embodiment, a method and apparatus are provided for accessing banking account information from a set of financial institutions that follow a variety of account-linking mechanisms. In at least one embodiment, a financial institution from a set of financial institutions may provide a direct application-specific interface (API) for specialized vendors (e.g., Plaid) to gather user account information. In at least one embodiment, user account information may then be provided to applications such as mobile payment applications on a mobile device. In at least one embodiment, account-linking mechanism is an API. In at least one embodiment, account-linking mechanism is a web-interface for direct interaction with a financial institution. In at least one embodiment, a mobile device receives account information for a user directly from a financial institution based at least in part on direct interaction with financial institution without having a device, which is not mobile device, interact with financial institution to gather account information.

In at least one embodiment, process of receiving account information includes downloading a first set of instructions from a remote device (e.g., cloud, another mobile device, server, etc.) to a mobile device. As such, first set of instructions are remotely loaded on to mobile device. In at least one embodiment, first set of instructions are executed by mobile device to log into a web-interface of financial institution. In at least one embodiment, one or more login credentials (e.g., username and password) are gathered from a user and provided to a financial institution. In at least one embodiment, process of receiving account information includes downloading a second set of instructions from a remote device to mobile device. In at least one embodiment, second set of instructions are executed to scrape account information, which may include an account number and a routing number. In at least one embodiment, account information is sent to a server where it is paired with user's identity. In at least one embodiment, mobile device can indirectly interact with a financial institution to receive account information. For example, mobile device can indirectly interact with a first financial institution through a third-party server to gather first account information, and can directly interact with a second financial institution without using a third-party server to gather second account information.

Here, "financial institution" generally refers to a bank, credit union, mortgage account, investment account, credit card account, or any other such account where a user may have financial assets. In at least one embodiment, a user may have one or more accounts with a financial institution. In at least one embodiment, an account may have information associated with it including account number, routing number, username, password, etc.

Here, "account information" generally refers to information associated with an account of a user at a financial institution. In at least one embodiment, account information may include account number, routing number, token account number, login credentials (e.g., username, password), user full name or legal name, address, balance, credit, bill payees, etc.

Here, "scrape" generally refers to gathering information from a website. In at least one embodiment, web crawlers are employed to gather information from a website. In at least one embodiment, to scrape a website, data is read from website.

FIG. 1 illustrates secure mobile scraping system 100, in accordance with at least one embodiment. In at least one embodiment, system 100 comprises a user device 101 (e.g., a mobile device), one or more O-Auth Financial Institutions 102, server 103, third-party server 104, one or more O-Auth Financial Institutions 105, and one or more Non-O-Auth Financial Institution 106. In at least one embodiment, various components of system 100 may be connected or connectable by wired or wireless means. In at least one embodiment, user device 101 includes a display 101*a* (e.g., a touch screen) which displays one or more applications including an application to connect to one or more financial institutions. In at least one embodiment, one or more applications includes a fast pay application that allows user device 101 to make payments by contactless means with a point-of-user-interface apparatus (e.g., merchant terminal).

Here, "O-Auth Institutions" generally refer to financial institutions that have set up direct API access for account-linking providers such as Plaid. Here, "Non-O-Auth Institutions" generally refer to financial institutions that allow non-API access for scraping account information from financial institutions.

In at least one embodiment, user device 101 includes an antenna and one or more circuitries (e.g., processor) coupled to antenna. In at least one embodiment, one or more circuitries are to execute instructions to receive account information for a user directly from one or more O-Auth Financial Institutions 102 based at least in part on direct interaction with one or more O-Auth Financial Institutions 102 without having a device, which is not user device 101, interact with one or more O-Auth Financial Institutions 102 to gather account information.

In at least one embodiment, instructions include first instructions that are downloaded to user device 101 from a remote device (e.g., cloud, server 103, or any other suitable computer). In at least one embodiment, first instructions are to cause user device 101 to log into a web-interface of a financial institution (e.g., one or more O-Auth Financial Institutions 102). Examples of O-Auth financial institutions includes Chase, Wells Fargo, and CapitalOne. In at least one embodiment, first instructions gather one or more login credentials (e.g., a username and a password). In at least one embodiment, first instructions provide login credentials to one or more O-Auth Financial Institutions 102 via communication link 107. In at least one embodiment, first instructions gather one or more login credentials and provide one or more login credentials (e.g., a username and a password) to one or more O-Auth Financial Institutions 105 via communication link 109 and third-party server 104. In at least one embodiment, communication link 109 can be wired or wireless communication. In at least one embodiment, first instructions allow a user to directly log into one or more O-Auth Financial Institutions 102 without involvement of third-party server 104.

In at least one embodiment, instructions executed by user device 101 include second instructions that are downloaded to user device 101 from a remote device (e.g., cloud, server 103, or any other suitable computer). In at least one embodiment, second instructions are to scrape account information. In at least one embodiment, account information includes user account name, account number, user full name (e.g., legal name), and/or bank routing number. In at least one embodiment, account information includes all accounts (e.g., checking, saving, investment, credit card, etc.) held by user in one or more O-Auth Financial Institutions 102. In at least one embodiment, scraped information is not an account number or a routing number. In at least one embodiment, scraped information includes a list of account names and balances associated with those account names. In at least one embodiment, mobile device receives scraped account information via communication link 107. In at least one embodiment, user device 101 receives scraped account information via communication link 107. In at least one embodiment, process of scraping involves reading content displayed on a webpage of one or more O-Auth Financial Institutions 102. In at least one embodiment, selective content (e.g., name, account number, routing number) is read from webpage of one or more O-Auth Financial Institutions 102. In at least one embodiment, scraping of user bank information is done directly or locally on user device 101 without involvement of third-party server 104. In at least one embodiment, communication link 107 can be wired or wireless communication link.

In at least one embodiment, instructions executed by user device 101 include third instructions that send account information to server 103 via communication link 108. In at least one embodiment, third instructions are downloaded from server 103 to user device 101. As such, third instructions are remotely loaded onto user device 101 via communication link 108. In at least one embodiment, account information scraped by user device 101 from screen or web information displayed by one or more O-Auth Financial Institutions 102 is then sent by user device 101 to server 103. In at least one embodiment, server 103 uses this account information for contactless payment by user device 101. In at least one embodiment, communication link 108 can be wired or wireless communication link. In at least one embodiment, user device 101 includes a camera or a biometric sensor to authenticate user prior to execution of instructions.

In at least one embodiment, instructions executed by user device 101 include fourth instructions which are to indirectly interact with a second financial institution (e.g., one or more O-Auth Financial Institutions 105 and/or one or more Non-O-Auth Financial Institutions 106) to receive account information for user from second financial institution.

In at least one embodiment, third-party server 104 uses an API provided by one or more O-Auth Financial Institutions 105 to access account information via communication link 111. In at least one embodiment, user device 101 provides one or more login credentials (e.g., username and password) to third-party server 104, which in turn communicates with financial institutions (e.g., one or more O-Auth Financial Institutions 105 or one or more Non-O-Auth Financial Institutions 106) to scrape webpage of financial institutions to gather account information. In at least one embodiment, communication link 111 can be wired or wireless communication. In at least one embodiment, third-party server 104 scrapes web-screen of one or more Non-O-Auth Financial Institutions 106 to gather account information via communication link 112. In at least one embodiment, communication link 112 can be wired or wireless communication link. In at least one embodiment, third-party server 104 uses a direct API to access account information from one or more O-Auth Financial Institutions 105. In at least one embodiment, third-party server 104 uses webpage scraping to gather account information from one or more Non-O-Auth Financial Institutions 106. In at least one embodiment, third-party server 104 provides account information it retrieves from one or more O-Auth Financial Institutions 105 and/or one or more Non-O-Auth Financial Institutions 106 to server 103 via communication link 110. In at least one embodiment, communication link 110 can be wired or wireless communication link.

In at least one embodiment, at least some of instructions executed by user device 101 are part of a mobile application stored in a memory of user device 101. In at least one embodiment, at least some of instructions executed by user device 101 are downloaded from a remote device. In at least one embodiment, remote device is a server 103. In at least one embodiment, remote device is a database 113. In at least one embodiment, database 113 is any one of centralized database, distributed database, personal database, end-user database, commercial database, NoSQL database, operational database, and/or relational database. In at least one embodiment, scraping instructions that may be part of first instructions, second instructions, or third instructions, are provided to user device 101 from database 113 via server 103 and communication link 108 and communication link 114. In at least one embodiment, communication link 114 can be a wired or wireless communication link. In at least one embodiment, scraping instructions that may be part of first instructions, second instructions, or third instructions, are provided to user device 101 from database 113 directly via communication link 115. In at least one embodiment, communication link 115 is a wired or wireless communication link.

In at least one embodiment, scraping instructions have a standard format to scape information from financial institutions. In at least one embodiment, scraping instructions have a format that is open for others to contribute. In at least one embodiment, contribution to scraping instructions are documented. In at least one embodiment, contribution to scraping instructions allow for instructions to be updated as financial institutions may update their webpages, APIs, or access means.

Financial institutions may block access from third-party servers (e.g., third-party server 104) to protect user privacy. In at least one embodiment, user device 101 can directly connect with financial instructions by by-passing third-party servers.

In at least one embodiment, user device 101 or an interacting device is used for making a payment or participating or interacting in a transaction after user device 101 establishes a link between user and financial institution (e.g., one or more O-Auth Financial Institutions 102, one or more O-Auth Financial Institutions 105, and/or one or more Non-O-Auth Financial Institutions 106). In at least one embodiment, user device 101 acts as a reader that can read a communication target from a point-of-user-interaction apparatus. An example of a communication target is a Near-field Communication (NFC) tag such as an ISO 14443 compatible radio link, an ISO 18092 compatible radio link, or an IEEE 802.15.4 compatible radio link.

In at least one embodiment, a point-of-user-interaction apparatus comprises a merchant terminal that can process credit card payments using a magnetic reader or via a tap of user device 101 on its screen (e.g., screen of merchant terminal). In at least one embodiment, point-of-user-interaction apparatus comprises an active communication target transmitter (e.g., an active NFC) instead of user device 101. Upon tap, an authentication process begins where keys and tokens are exchanged with a backend device (e.g., a computing device or server on a cloud such as server 103). In at least one embodiment, tokens are decoded by keys, and transaction is authenticated for validity based on decoding. If transaction is valid, user device 101 and point-of-user-interaction apparatus are notified of validity.

In at least one embodiment, point-of-user-interaction apparatus generates a first identification. In at least one embodiment, first identification (e.g., a matcher token) is used to match a first authentication information with a second authentication information. In at least one embodiment, a matcher token is generated dynamically for each transaction. In at least one embodiment, a merchant identification (Merchant ID) is a fixed ID for a merchant terminal. In at least one embodiment, first authentication information is generated by point-of-user-interaction apparatus and provided to user device 101, which in turn provides it to server 103.

In at least one embodiment, point-of-user-interaction apparatus transmits second authentication information to server 103. In at least one embodiment, user device 101 generates a second identification (e.g., customer ID (also referred to as user ID)) which is a unique identification. In at least one embodiment, first identification is provided to server 103 via user device 101. In at least one embodiment, second identification is provided to server 103 via point-of-user-interaction apparatus. In at least one embodiment, second identification is used to identify user device 101 to point-of-user-interaction apparatus.

Continuing with this example, which can be modified to use other forms of IDs, second identification generated by user device 101 can be provided to server 103 via point-of-user-interaction apparatus, and second identification (herein also referred to as a third identification) generated by point-of-user-interaction apparatus is provided to server 103 via user device 101. In at least one embodiment, server 103 receives second identifications (also referred to as second and third identifications) from two different sources and via two different paths. In at least one embodiment, second identifications (also referred to as second and third identifications) can be a user ID, merchant ID, or other forms of IDs (such as encrypted IDs). In at least one embodiment, second and third identifications are usually same IDs but can be different too. For example, third identification is an encrypted form of second identification or vice versa. In at least one embodiment, encryption can take place on any suitable device. In at least one embodiment, place where ID resides and/or originates is where ID can be encrypted. In at least one embodiment, a device transmitting ID may encrypt ID for subsequent transmission. In at least one embodiment, second identifications, in one example, is used to identify parties involved in a transaction. This exchange of second identifications in such manner further provides a secure authentication mechanism to authenticate a transaction upon a tap, in accordance with at least one embodiment. In at least one embodiment, exchange of second identifications may occur via any suitable means such as application programmable interfaces (APIs), NFC communication, wireless or wired means. In at least one embodiment, by exchange of second identifications, server 103 can authenticate transaction.

In at least one embodiment, by making user device 101 a reader instead of making point-of-user-interaction apparatus a reader, and by making point-of-user-interaction apparatus an active communication target transmitter (e.g., an active NFC) instead of user device 101, a secure transaction process can be applied to any user device regardless of device manufacture limitations on access to active communication target transmitter. In at least one embodiment, exchange of information between point-of-user-interaction apparatus, user device 101, and server 103 (e.g., cloud or computing device) verifies physical presence of a user of user device 101 and its interaction with point-of-user-interaction apparatus. As such, validity of transaction is tied to a physical presence of user, and this process further reduces fraudulent transactions.

In at least one embodiment, interactions between various components of system 100 are encrypted to enhance security of data transfer. In at least one embodiment, communication or interaction between user device 101 and server 103 is encrypted. In at least one embodiment, communication or interaction between user device 101 and third-party server 104 is encrypted. In at least one embodiment, communication or interaction between one or more O-Auth Financial Institutions 102 and user device 101 are encrypted. In at least one embodiment, communication or interaction between one or more O-Auth Financial Institutions 105 and third-party server 104 are encrypted. In at least one embodiment, communication or interaction between one or more Non-O-Auth Financial Institutions 106 and third-party server 104 are encrypted. In at least one embodiment, communication or interaction between third-party server 104 and server 103 are encrypted. Any suitable type of encryption may be used.

Figure 2:
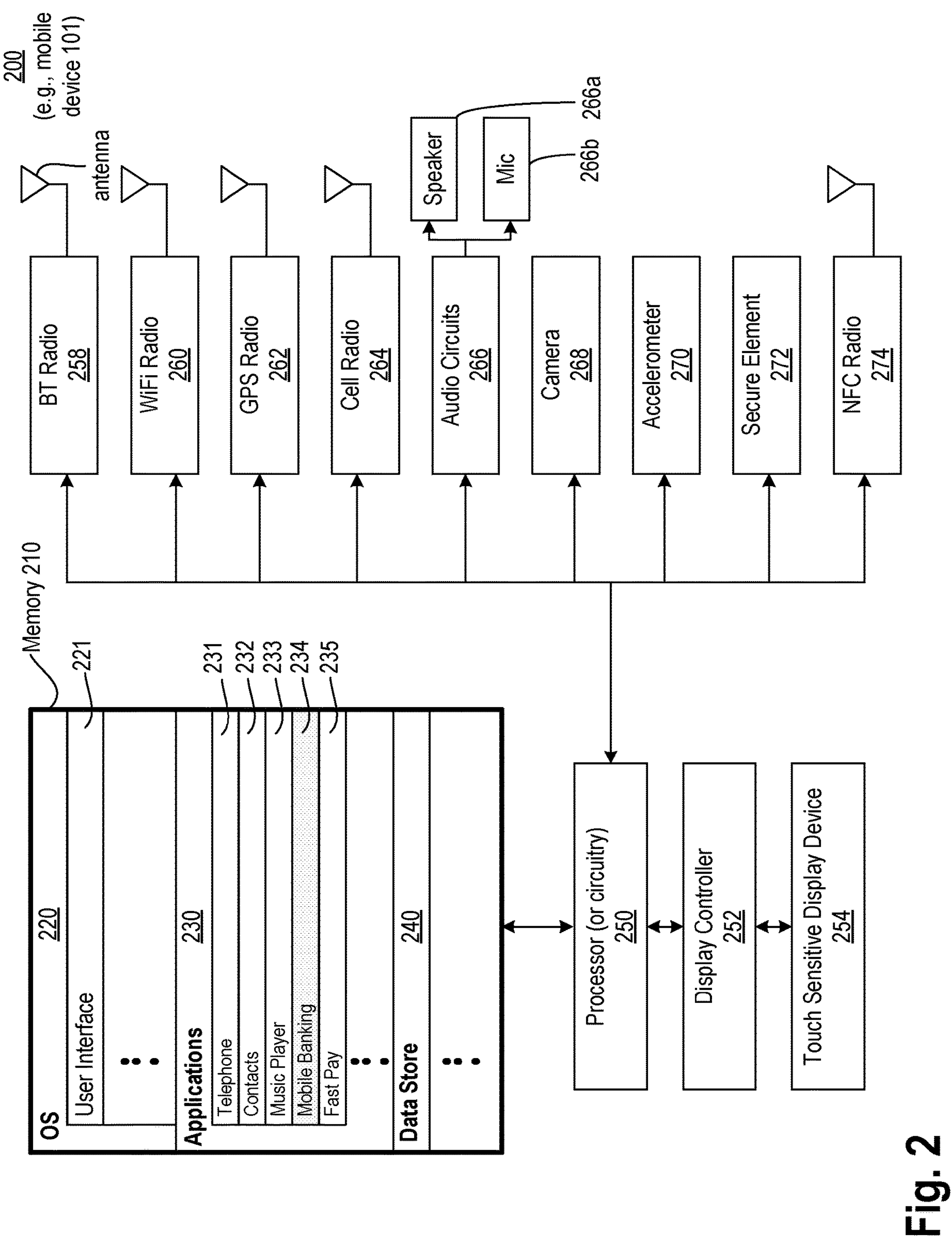
FIG. 2 illustrates a mobile device with software and hardware for secure banking scraping, in accordance with at least one embodiment.

FIG. 2 illustrates mobile device 200 (e.g., user device 101) with software and hardware for secure mobile transaction, in accordance with at least one embodiment. In at least one embodiment, mobile device 200 includes processor 250, memory 210, display controller 252, touch sensitive display device 254, Bluetooth radio 258, WiFi radio 260, GPS radio 262, cellular radio 264, audio circuits 266 (e.g., speaker 266*a* and Mic 266*b*), camera 268, accelerometer 270, secure element 272, and near-field communications (NFC) radio 274. In at least one embodiment, mobile device 200 may be any type of device that includes all or some of components shown. In at least one embodiment, mobile device 200 may be a cell phone, a smartphone, a tablet computer, a laptop computer, or like.

In at least one embodiment, processor 250 may be any type of processor capable of executing instructions stored in memory 210 and capable of interfacing with various components shown in FIG. 2. In at least one embodiment, processor 250 may be a microprocessor, a digital signal processor, an application specific processor, or like. In at least one embodiment, processor 250 is a component within a larger integrated circuit such as a system on chip (SOC) application specific integrated circuit (ASIC).

In at least one embodiment, display controller 252 provides an interface between processor 250 and touch sensitive display device 254. In at least one embodiment, display controller 252 is integrated within processor 250. In at least one embodiment, display controller 252 is integrated within touch sensitive display device 254.

In at least one embodiment, touch sensitive display device 254 is a display device that includes a touch sensitive surface, sensor, or set of sensors that accept input from a user. In at least one embodiment, touch sensitive display device 254 may detect when and where an object touches screen, and may also detect movement of an object across screen. In at least one embodiment, when touch sensitive display device 254 detects input, display controller 252 and processor 250 (in association with user interface component 221) determine appropriate response. In at least one embodiment, in response to user input, applications may be started, icons may be moved, or fast pay application may be started for secure payment transaction.

In at least one embodiment, touch sensitive display device 254 may be manufactured using any applicable display technologies, including for example, liquid crystal display (LCD), active-matrix organic light emitting diode (AMOLED), and like. In at least one embodiment, touch sensitive display device 254 may be manufactured using any application touch sensitive input technologies, including for example, capacitive and resistive touch screen technologies, as well as other proximity sensor technologies.

In at least one embodiment, Bluetooth radio 258 is a type of non-near-field radio capable of communicating on a frequency between 2.402 GHz and 2.480 GHz. In at least one embodiment, Bluetooth is an example of a non-near-field protocol because wavelength is on order of 4.5 inches and intended communication distance is typically much greater than 4.5 inches. Here, "non-near-field radio" is not meant to imply that distance of communication cannot be less than wavelength for non-near-field radio. In at least one embodiment, Bluetooth radio 258 can communicate on a personal-area network (PAN) with other Bluetooth devices on personal-area network. In at least one embodiment, Bluetooth radio 258 is omitted.

In at least one embodiment, WiFi radio 260 may be any type of radio capable of communicating over a wireless network. Examples include radios that are compatible with one or more of Institute of Electrical and Electronics Engineers (IEEE) 802.11 standards. In at least one embodiment, WiFi radio 260 is omitted. In at least one embodiment, mobile device 200 uses WiFi radio 260 to communicate with server 103.

In at least one embodiment, GPS radio 262 includes a global positioning system (GPS) receiver capable of determining present location (e.g., latitude and longitude) of mobile device 200. In at least one embodiment, GPS radio 262 is used to provide location information to communicate with server 103. In at least one embodiment, cellular radio 264 may be any type of radio that can communicate within a cellular network. Examples include, but are not limited to, radios that communicate using orthogonal frequency division multiplexing (OFDM), code division multiple access (CDMA), time division multiple access (TDMA), and like. In at least one embodiment, cellular radio 264 may operate at any frequency or combination of frequencies without departing from scope of present invention. In at least one embodiment, cellular radio 264 is omitted. In at least one embodiment, mobile device 200 uses cellular radio 264 to communicate with server 103.

In at least one embodiment, audio circuits 266 provide an interface between processor 250 and audio devices such as a speaker and microphone.

In at least one embodiment, camera 268 may be any camera suitable for use in a mobile device. In at least one embodiment, camera 268 may include a CMOS sensor with optics or any other type of image capture device at any resolution. In at least one embodiment, camera 268 may be operated by a camera software application (not shown). In at least one embodiment, accelerometer 270 detects motion of mobile device 200, and may be used by any software application.

In at least one embodiment, secure element 272 provides secure information storage. In at least one embodiment, secure element 272 is a smartcard compatible secure element commonly found in credit card applications and/or security applications. In at least one embodiment, NFC radio 274 provides near-field communications capability between mobile device 200 and other devices nearby. In at least one embodiment, NFC radio 274 may operate at 13.56 megahertz, although this is not a limitation of present invention. In at least one embodiment, mobile device 200 uses NFC radio 274 to communicate with a point-of-user interface apparatus.

In at least one embodiment, secure element 272 is combined with NFC radio 274 in a single integrated circuit such as a smartcard controller. In at least one embodiment, secure element 272, or a combination of secure element 272 and NFC radio 274 are integrated into another semiconductor device such as processor 250.

Examples of smart card controllers that combine secure element 272 with NFC radio 274 are "SmartMX" controllers sold by NXP Semiconductors N.V. of Eindhoven, The Netherlands. In at least one embodiment, secure element has an ISO/IEC 7816 compatible interface that communicates with other components within mobile device 200 (e.g., processor 250), although this is not a limitation of at least one embodiment. In at least one embodiment, NFC radio 274 has an ISO/IEC 14443 contactless interface.

In at least one embodiment, mobile device 200 may include many other circuits and services that are not specifically shown in FIG. 2. In at least one embodiment, mobile device 200 may include an additional camera, haptic feedback devices, and like. Any number and/or type of circuits and services may be included within mobile device 200 without departing from scope of at least one embodiment.

In at least one embodiment, memory 210 may include any type of memory device. In at least one embodiment, memory 210 may include volatile memory such as static random-access memory (SRAM), or nonvolatile memory such as FLASH memory. In at least one embodiment, memory 210 is encoded with (or has stored therein) one or more software modules (or sets of instructions), that when accessed by processor 250, result in processor 250 performing various functions. In at least one embodiment, software modules stored in memory 210 may include an operating system (OS) 220 and applications 230. In at least one embodiment, applications 230 may include any number or type of applications. Examples provided in FIG. 2 include a telephone application 231, a contacts application 232, a music player application 233, mobile banking application 234, and a fast pay or secure transaction application 235. In at least one embodiment, memory 210 may also include any amount of space dedicated to data storage 240.

In at least one embodiment, operating system 220 may be a mobile device operating system such as an operating system to control a mobile phone, smartphone, tablet computer, laptop computer, or like. As shown in FIG. 2, in at least one embodiment, operating system 220 includes user interface component 221.

In at least one embodiment, user interface component 221 includes processor instructions that cause mobile device 200 to display content on touch sensitive display device 254, recognize user input, and to provide user input to applications. In at least one embodiment, user interface component 221 also includes instructions to display menus, move icons, and manage other portions of display environment.

In at least one embodiment, telephone application 231 may be an application that controls a cell phone radio. In at least one embodiment, contacts application 232 includes software that organizes contact information. In at least one embodiment, contacts application 232 may communicate with telephone application 231 to facilitate phone calls to contacts. In at least one embodiment, music player application 233 may be a software application that plays music files that are stored in data storage 240.

In at least one embodiment, mobile banking application 234 may be a software application that communicates with a banking service to allow banking functions such as balance inquiries, funds transfers, bill payment and like. In at least one embodiment, mobile banking application 234 may be a downloaded "thick" application, or may be a "thin" application that uses internet browser functionality. In at least one embodiment, other application examples include applications that store an identity such as a passport or a building access identity.

In at least one embodiment, mobile banking application 234 receives account information for a user directly from a financial institution (e.g., one or more O-Auth Financial Institutions 102) based at least in part on direct interaction (e.g., via communication link 107) with financial institution without having a device, which is not mobile device 200, interact with financial institution to gather account information. In at least one embodiment, mobile banking application 234 receives account information by downloading first instructions from a remote device to mobile device 200. In at least one embodiment, mobile banking application 234 receives further account information by gathering one or more login credentials (e.g., a username and a password). In at least one embodiment, mobile banking application 234 receives account information by logging, via execution of first instructions, into a web-interface of financial institution. In at least one embodiment, mobile banking application 234 receives account information by providing the one or more login credentials (e.g., username and password) to financial institution.

In at least one embodiment, mobile banking application 234 receives account information by downloading second instructions from a remote device to mobile device. In at least one embodiment, mobile banking application 234 receives further account information by scraping, via execution of second instructions, account information, wherein account information includes an account number and a routing number. In at least one embodiment, mobile banking application 234 sends account information to server 103. In at least one embodiment, mobile banking application 234 indirectly interacts with one or more O-Auth Financial Institutions 105 and/or one or more Non-O-Auth Financial Institutions 106 via third-party server 104 to gather account information from those one or more financial institutions.

In at least one embodiment, mobile banking application 234 includes processor instructions that allow mobile device 200 to perform mobile payments. For example, fast pay or secure transaction application 235 may include processor instructions that handle access to one or more payment instruments such as credit cards, debit cards, and pre-paid cards. In at least one embodiment, fast pay or secure transaction application 235 may include some or all functions of mobile banking application 234.

In at least one embodiment, fast pay or secure transaction application 235 communicates with secure element 272 (e.g., smartcard secure element) and/or NFC radio 274 within mobile device 200. In at least one embodiment, fast pay or secure transaction application 235 may store and access payment identities in secure element 272 and allow proximity payments using NFC radio 274.

In at least one embodiment, each of above-identified applications correspond to a set of instructions for performing one or more functions described above. In at least one embodiment, these applications (sets of instructions) need not be implemented as separate software programs, procedures or modules, and thus various subsets of these applications may be combined or otherwise re-arranged in various embodiments. In at least one embodiment, telephone application 231 may be combined with contacts application 232. In at least one embodiment, memory 210 may store additional applications (e.g., video players, camera applications, etc.) and data structures not described above.

In at least one embodiment, mobile device 200 is presented as an example of a user device, and that mobile device 200 may have more or fewer components than shown, may combine two or more components, or may have a different configuration or arrangement of components. In at least one embodiment, mobile device 200 may include many more components such as sensors (optical, touch, proximity etc.), or any other components suitable for use in a mobile device.

Figure 3:
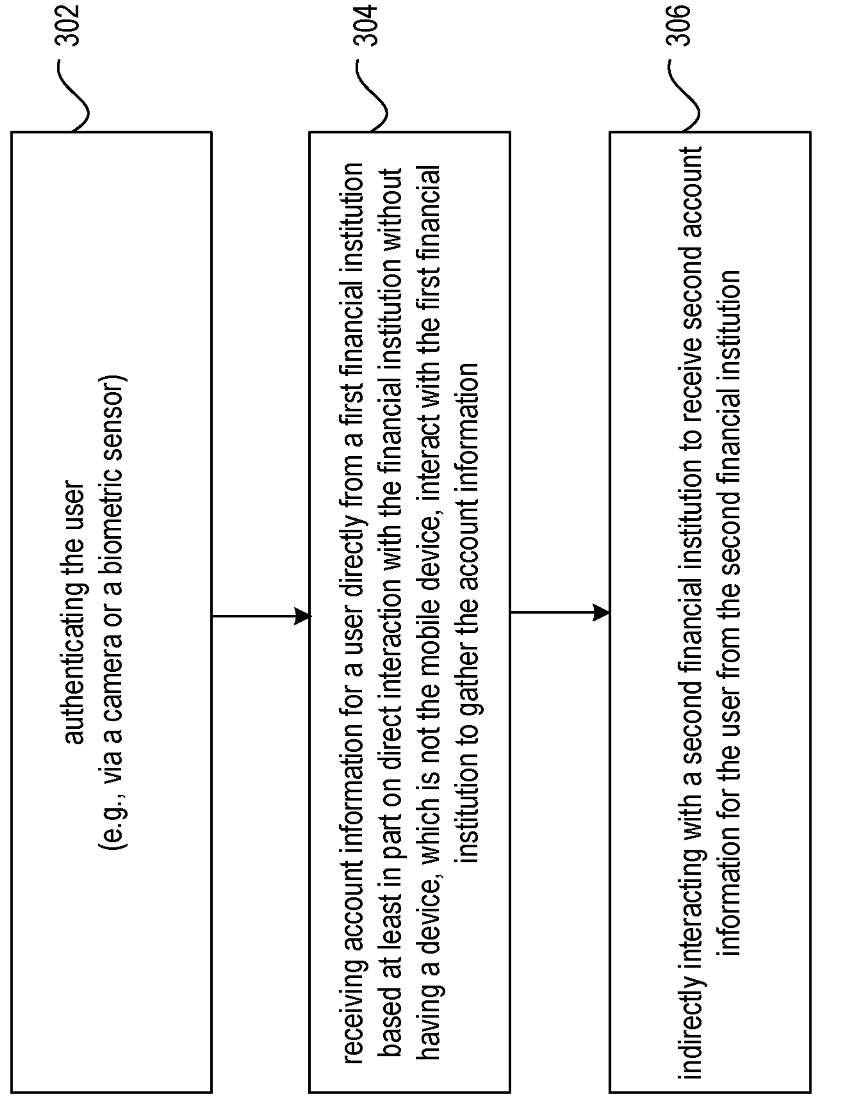
FIG. 3 illustrates a flowchart of a method performed by a mobile device to access account information of a user from different types of financial institutions, in accordance with at least one embodiment.

FIG. 3 illustrates flowchart 300 of a method performed by a mobile device to access account information of a user from different types of financial institutions, in accordance with at least one embodiment. While various blocks are shown in a particular order, order can be modified. For example, some blocks may be performed in parallel while some blocks may be performed before others. In at least one embodiment, various blocks here can be performed by software, hardware, or a combination of them.

In at least one embodiment, at operation block 302 user is authenticated. In at least one embodiment, a user is authenticated via one or more sensors. In at least one embodiment, one or more sensors include a camera and/or biometric sensor (e.g., fingerprint sensor). In at least one embodiment, camera can authenticate a user by comparing user face with a stored image of user. In at least one embodiment, at operation block 304, user device 101 receives account information for user directly from financial institution (e.g., one or more O-Auth Financial Institutions 102) based at least in part on direct interaction with financial institution without having a device, which is not user device 101, interact with financial institution to gather account information. In at least one embodiment, at operation block 306, user device 101 indirectly interacts with a different financial institution (herein second financial institution) such as one or more O-Auth Financial Institutions 105 and/or one or more Non-O-Auth Financial Institution 106. In at least one embodiment, operation block 306 is performed before operation block 304.

In at least one embodiment, user device 101 indirectly interacts with second financial institution to receive second account information for use from second financial institution. As such, in at least one embodiment, user device 101 can procure user account information directly from one or more O-Auth Financial Institutions 102, and indirectly from other one or more O-Auth Financial Institutions 105 and one or more Non-O-Auth Financial Institutions 106.

Figure 4:
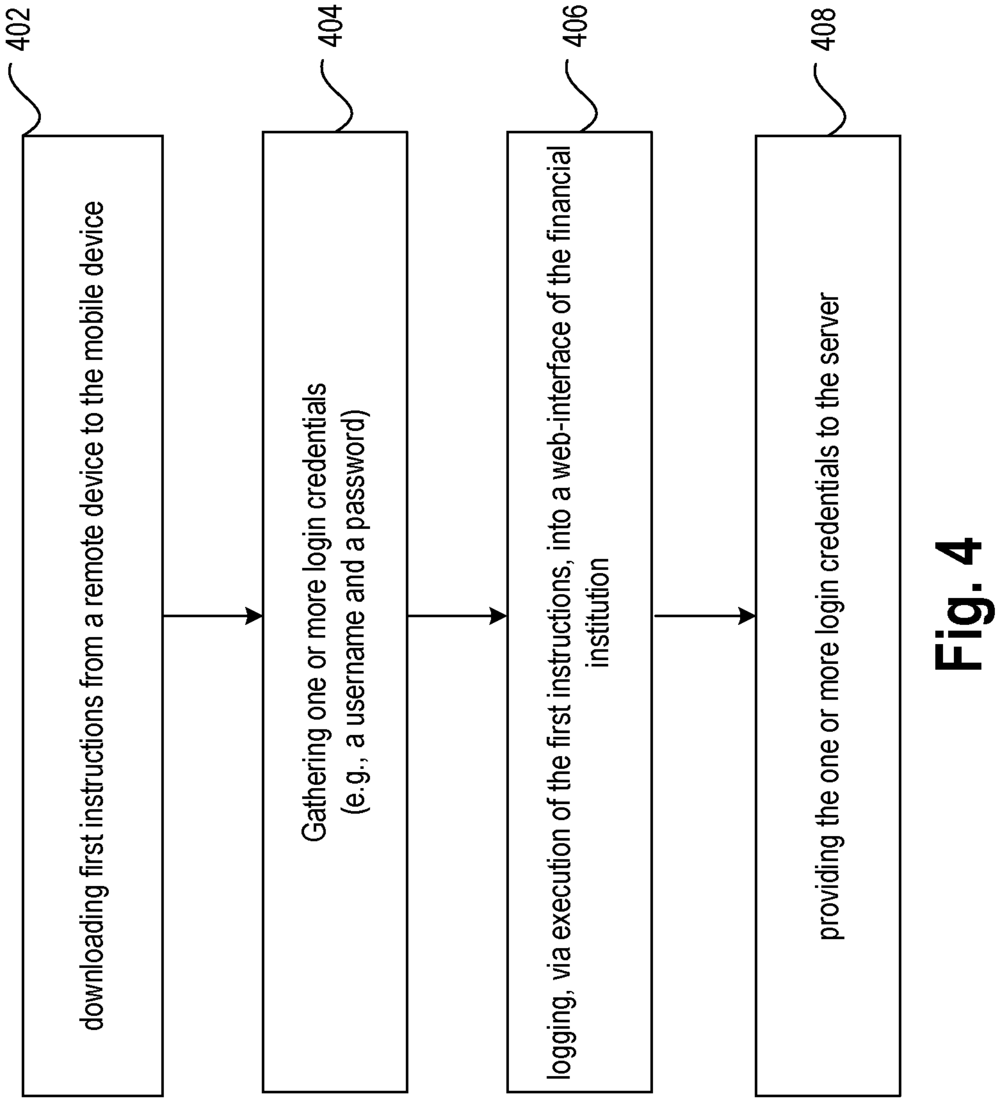
FIG. 4 illustrates a flowchart of a method performed by a mobile device to gather one or more login credentials (e.g., username and password) and provide it to a financial institution, in accordance with at least one embodiment.

FIG. 4 illustrates flowchart 400 of a method performed by a mobile device to gather one or more login credentials (e.g., username and password) and provide it to a financial institution, in accordance with at least one embodiment. While various blocks are shown in a particular order, order can be modified. For example, some blocks may be performed in parallel while some blocks may be performed before others. In at least one embodiment, various blocks here can be performed by software, hardware, or a combination of them.

In at least one embodiment, at operation block 402, user device 101 downloads first instructions from a remote device to user device 101. In at least one embodiment, at operation block 404, user device 101 gathers one or more login credentials. In at least one embodiment, one or more login credentials include username and password. In at least one embodiment, at operation 406, user device 101 logs, via execution of first instructions, into a web-interface of a financial institution (e.g., one or more O-Auth Financial Institutions 102). In at least one embodiment, user device 101 provides login credentials to financial institution. In at least one embodiment, user device 101 provides login credentials to server 103 for future access of account from financial institution.

Figure 5:
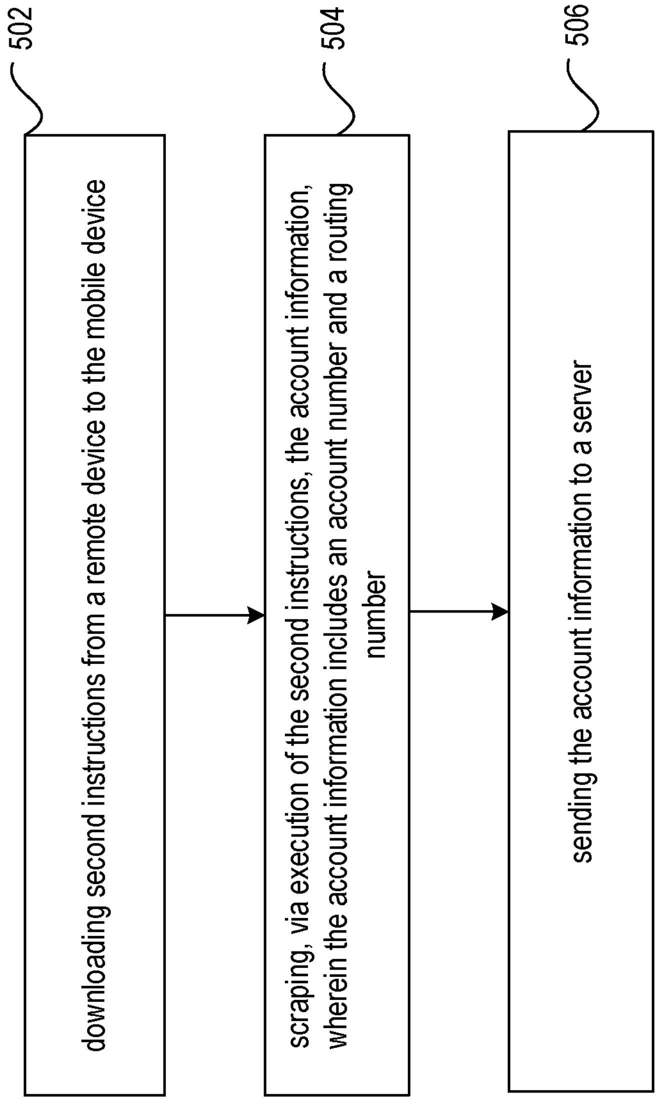
FIG. 5 illustrates a flowchart of a method performed by a mobile device to scrape account information from a financial institution, in accordance with at least one embodiment.

FIG. 5 illustrates flowchart 500 of a method performed by a mobile device to scrape account information from a financial institution, in accordance with at least one embodiment. While various blocks are shown in a particular order, order can be modified. For example, some blocks may be performed in parallel while some blocks may be performed before others. In at least one embodiment, various blocks here can be performed by software, hardware, or a combination of them.

In at least one embodiment, at operation block 502, user device 101 downloads second instructions from a remote device to mobile device. In at least one embodiment, at operation block 504, user device 101 scrapes, via execution of second instructions, account information, wherein account information includes an account number and a routing number. In at least one embodiment, user device 101 scrapes account information from one or more O-Auth Financial Institutions 102. In at least one embodiment, scraped information does not include account number or routing number. In at least one embodiment, scraped information includes list of account names and their balances. In at least one embodiment, at operation block 506, user device 101 sends account information to server 103. In at least one embodiment, this account information in server 103 may be later used for contactless payment processing.

In at least one embodiment, various flowcharts discussed herein can be part of a program software code. In at least one embodiment, program software code/instructions may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In at least one embodiment, program software code/instructions associated with processes of various embodiments are executed by a processor system.

In at least one embodiment, program software code/instructions are stored in a computer executable storage medium and executed by a processor. Here, computer executable storage medium is a tangible machine-readable medium that can be used to store program software code/instructions and data that, when executed by a computing device, causes one or more processors to perform a process.

In at least one embodiment, tangible machine-readable medium may include storage of executable software program code/instructions and data in various tangible locations, including for example ROM, volatile RAM, non-volatile memory and/or cache and/or other tangible memory as referenced in present application. In at least one embodiment, portions of this program software code/instructions and/or data may be stored in any one of these storage and memory devices. In at least one embodiment, program software code/instructions can be obtained from other storage, including, e.g., through centralized servers or peer to peer networks and like, including the Internet. In at least one embodiment, different portions of software program code/instructions and data can be obtained at different times and in different communication sessions or in a same communication session.

In at least one embodiment, software program code/instructions associated with various embodiments can be obtained in their entirety prior to execution of a respective software program or application. In at least one embodiment, Alternatively, portions of software program code/instructions and data can be obtained dynamically, e.g., just in time, when needed for execution. In at least one embodiment, alternatively, some combination of these ways of obtaining software program code/instructions and data may occur, e.g., for different applications, components, programs, objects, modules, routines or other sequences of instructions or organization of sequences of instructions, by way of example. In at least one embodiment, thus, it is not required that data and instructions be on a tangible machine-readable medium in entirety at a particular instance of time.

In at least one embodiment, tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. In at least one embodiment, software program code/instructions may be temporarily stored in digital tangible communication links while implementing electrical, optical, acoustical, or other forms of propagating signals, such as carrier waves, infrared signals, digital signals, etc. through such tangible communication links.

While at least one embodiment is described with reference to a user device being a mobile device, methods and apparatus discussed herein are applicable to any computing device such as a desktop device, tablets, wearable devices, computing devices in vehicles (planes, trains, automobiles), etc.

Here, "connected" may generally refer to a direct connection, such as electrical, mechanical, or magnetic connection between things that are connected, without any intermediary devices.

Here, "coupled" may generally refer a direct or indirect connection, such as a direct electrical, mechanical, or magnetic connection between things that are connected or an indirect connection, through one or more passive or active intermediary devices.

Here, "adjacent" here may generally refer to a position of a thing being next to (e.g., immediately next to or close to with one or more things between them) or adjoining another thing (e.g., abutting it).

Here, "circuit" or "module" may generally refer to one or more passive and/or active components that are arranged to cooperate with one another to provide a desired function. In at least one embodiment, a module may also refer to one or more blocks of software code that perform one or more functions.

Here, "signal" may generally refer to at least one current signal, voltage signal, magnetic signal, or data/clock signal. In at least one embodiment, meaning of "a," "an," and "the" include plural references. In at least one embodiment, meaning of "in" includes "in" and "on."

Here, "analog signal" may generally refer to any continuous signal for which time varying feature (variable) of signal is a representation of some other time varying quantity, i.e., analogous to another time varying signal.

Here, "digital signal" may generally refer to a physical signal that is a representation of a sequence of discrete values (a quantified discrete-time signal), for example of an arbitrary bit stream, or of a digitized (sampled and analog-digital converted) analog signal.

Here, "substantially," "close," "approximately," "near," and "about," may generally refer to being within +/−10% of a target value. For example, unless otherwise specified in explicit context of their use, terms "substantially equal," "about equal" and "approximately equal" mean that there is no more than incidental variation between among things so described. In at least one embodiment, such variation is no more than +/−10% of a predetermined target value.

Unless otherwise specified use of ordinal adjectives "first," " "second," and "third," etc., to describe a common object, merely indicate that different instances of like objects are being referred to, and are not intended to imply that objects so described must be in a given sequence, either temporally, spatially, in ranking or in any other manner.

Here, phrases "A and/or B" and "A or B" mean (A), (B), or (A and B). Here, phrase "A, B, and/or C" means (A), (B), (C), (A and B), (A and C), (B and C), or (A, B and C).

Here "mobile device" or "user device" or an "interacting device" may generally refer to a smart device that can execute one or more software. In at least one embodiment, a mobile device or an interacting device may be any device capable of communicating over a communication interface (e.g., a radio, Near-field Communication (NFC), Bluetooth, cellular, wired means such as Universal Serial Bus (USB), etc.). Examples of mobile device include a smart phone, a tablet, a watch, or other wearable devices.

Here, "near-field" or "Near-field Communication (NFC)" may generally refer to communication protocols and compatible radios in which maximum intended communication distance is less than wavelength of radio wave used for that communication. ISO 14443 (NFC) is an example of near-field because wavelength is on order of 870 inches and intended communication distance is only a few inches. In at least one embodiment, all communications protocols and compatible radios that are not near-field are referred to herein as "non-near-field." In at least one embodiment, a non-near-field protocol may be BLUETOOTH™ because wavelength is on order of 4.5 inches and intended communication distance is typically much greater than 4.5 inches. In at least one embodiment, "non-near-field radio" is not meant to imply that distance of communication cannot be less than wavelength for non-near-field radio.

Here, "tap" may generally refer to an action that brings one device close enough to another device to engage a communication protocol (e.g., an NFC communication). In at least one embodiment, two devices may be in direct contact with one other or substantially close to trigger a communication between two devices. In at least one embodiment, a communication may be one way or bidirectional.

Here, "transaction" as used herein may generally refer to process of accepting and/or operating on a point-of-sale transaction. In at least one embodiment, a transaction may include tallying votes on a validated ballot, or acceptance of a point-of-sale operation, acceptance of an e-commerce deal, signing a digital and/or physical document, registering with an organization, attendance verification, security verification at an office, airport, or any point of entry or exit, etc.

Here, "Transaction ID" or "TID" may generally refer to software or hardware based identifier which includes a token and a corresponding key.

Here, "TID Token" (e.g., TID Token1 and TID Token2) may generally refer to a software or hardware-based variable-length format of information associated with transaction described herein. In at least one embodiment, a TID token may comprise a key value and a control information in a data section of that information. In at least one embodiment, a TID Token may comprise of a header that defines type of token and security algorithm used; a payload that contains user information and metadata such as token duration and time of creation; and a signature to verify sender's identity and message's authenticity. In at least one embodiment, a TID Token may be an assertion of a user's identity.

Here, "TID Key" (e.g., TID Key1 and TID Key2) may generally refer to a software or hardware set of bits that are used to decrypt or encrypt a token. In at least one embodiment, TID Key1 may be used to encrypt and decrypt TID Token1.

Here, "Matcher", "Matcher ID" or "Matcher Token" or "MT" may generally refer to a unique identifier (e.g., a 16-byte identifier) used to pair transaction receipts so that transaction receipts may be used to decrypt each other's TIDs. In at least one embodiment, Matcher may be like a TID but is not encrypted in some examples.

Here, "User ID", "UID", "Customer ID", or "CID" may generally refer to a unique identification for a user device such as a mobile device. In at least one embodiment, a User ID may be a media access control address (MAC address) or serial number assigned by Original Equipment Manufacturer (OEM).

Here, "Merchant ID" or "MID" may generally refer to a unique identification for a merchant device such as a point-of-user-interaction terminal or point-of-sale equipment. In at least one embodiment, a Merchant ID may be a media access control address (MAC address) or serial number assigned by Original Equipment Manufacturer (OEM).

Here, "security element" or "secure element" may generally refer to a point-of-user-interaction module that provides secure information storage. Secure element may include an NFC radio and a controller. In at least one embodiment, secure element may include one or more interfaces. In at least one embodiment, secure element may include an NFC radio with an enhancement circuit or controller with a secure function that includes applets, keys, or digital certificates to validate an identity of a certificate holder. Secure element may have ability to communicate with a user device (e.g., a mobile device) and a merchant terminal.

Reference in specification to "an embodiment," "one embodiment," "some embodiments," or "other embodiments" means that a particular feature, structure, or characteristic described in connection with embodiments is included in at least some embodiments, but not necessarily all embodiments. Various appearances of "an embodiment," "at least one embodiment," "one embodiment," or "some embodiments" are not necessarily all referring to same embodiments. If specification states a component, feature, structure, or characteristic "may," "might," or "could" be included, that particular component, feature, structure, or characteristic is not required to be included. If specification or claim refers to "a" or "an" element, that does not mean there is only one of the elements. If specification or claims refer to "an additional" element, that does not preclude there being more than one of additional elements.

Here, particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While at least one embodiment is described in conjunction with a specific implementation, many alternatives, modifications, and variations of such an implementation may be apparent to those of ordinary skill in art considering foregoing description. At least one embodiment is intended to embrace all such alternatives, modifications, and variations as to fall within broad scope of appended claims.

Following examples are provided that illustrate at least one embodiment. Here, examples can be combined with other examples. As such, at least one embodiment can be combined with at least another embodiment without changing at least one embodiment. For example, example 7 can be combined with example 3 or 2, or both.

Example 1: A mobile device comprising: an antenna; and one or more circuitries coupled to the antenna, wherein the one or more circuitries are to execute instructions to receive account information for a user directly from a financial institution based at least in part on direct interaction with the financial institution without having a device, which is not the mobile device, interact with the financial institution to gather the account information.

Example 2: The mobile device of claim 1, wherein the instructions include first instructions that are downloaded to the mobile device from a remote device, wherein the first instructions are to cause the mobile device to log into a web-interface of the financial institution.

Example 3: The mobile device of claim 1, wherein the instructions include first instructions that gather one or more login credentials.

Example 4: The mobile device of claim 3, wherein the first instructions provide the one or more login credentials to the financial institution.

Example 5: The mobile device of claim 1, wherein the instructions include second instructions that are downloaded to the mobile device from a remote device, wherein the second instructions are to scrape the account information, wherein the account information includes an account number and a routing number.

Example 6: The mobile device of claim 1, wherein the instructions include second instructions that are downloaded to the mobile device from a remote device, wherein the second instructions are to scrape information, wherein the information is not an account number or a routing number.

Example 7: The mobile device of claim 5, wherein the instructions include third instructions to send the account information to a server via the antenna.

Example 8: The mobile device of claim 6, wherein the instructions include third instructions to send the information scraped to a server via the antenna.

Example 9: The mobile device of claim 1 comprises a camera or a biometric sensor to authenticate the user prior to execution of the instructions.

Example 10: The mobile device of claim 1, wherein the financial institution is a first financial institution, wherein the account information is a first account information, wherein the instructions include fourth instructions which are to indirectly interact with a second financial institution to receive second account information for the user from the second financial institution.

Example 11: The mobile device of claim 1, wherein at least some of the instructions are part of a mobile application stored in a memory of the mobile device, wherein at least some of the instructions are downloaded from a remote device.

Example 12: A method for secure transaction between a mobile device and a financial institution, the method comprising: receiving account information for a user directly from the financial institution based at least in part on direct interaction with the financial institution without having a device, which is not the mobile device, interact with the financial institution to gather the account information.

Example 13: The method of claim 12, wherein receiving the account information comprises: downloading first instructions from a remote device to the mobile device; and logging, via execution of the first instructions, into a web-interface of the financial institution.

Example 14: The method of claim 12, wherein receiving the account information comprises: gathering one or more login credentials; and providing the one or more login credentials to the financial institution.

Example 15: The method of claim 12, wherein receiving the account information comprises: downloading second instructions to the mobile device from a remote device; and scraping information via execution of the second instructions, wherein the information is not an account number or a routing number.

Example 16: The method of claim 12, wherein receiving the account information further comprises: downloading second instructions from a remote device to the mobile device; scraping, via execution of the second instructions, the account information, wherein the account information includes an account number and a routing number; and sending the account information to a server.

Example 17: The method of claim 12 comprises authenticating the user, via a camera or a biometric sensor.

Example 18: The method of claim 12, wherein the financial institution is a first financial institution, wherein the account information is a first account information, wherein the method further comprises: indirectly interacting with a second financial institution to receive second account information for the user from the second financial institution.

Example 19: A machine-readable storage media having one or more machine-readable instructions stored therein, that when executed, cause one or more machines to perform a method for secure transaction between a mobile device and a financial institution, the method according to any one of claims 12 to 18.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A mobile device comprising:

an antenna;

one or more circuitries coupled to the antenna, wherein the one or more circuitries are to execute instructions to receive account information for a user directly from a financial institution based at least in part on direct interaction with the financial institution; and a camera or a biometric sensor to authenticate the user prior to execution of instructions, wherein the instructions to receive the account information for the user and establish a link with the financial institution include:

first instructions to cause the one or more circuitries to log into a web-interface of the financial institution;

second instructions to extract the account information for the user by reading content displayed on the web-interface of the financial institution, wherein the second instructions are downloaded to the mobile device from a remote device and are to extract the account information, wherein the account information includes an account number and a routing number and/or information other than the account information and the routing number, wherein scraping of account information is done directly or locally on the mobile device without involvement of a third-party server, wherein interactions between the mobile device and the financial institution are encrypted, and wherein the mobile device establishes a direct connection with the financial institution by bypassing third-party servers; and third instructions to send the account information for the user to a server via the antenna, wherein the first instructions, the second instructions and the third instructions are downloaded to the one or more circuitries from a remote device, and wherein the one or more circuitries are used to make a payment, or participate or interact in a transaction after the one or more circuitries establishes the link with the financial institution.

2. The mobile device of claim 1, wherein the instructions include first instructions that gather one or more login credentials.

3. The mobile device of claim 2, wherein the first instructions provide the one or more login credentials to the financial institution.

4. The mobile device of claim 1, wherein the financial institution is a first financial institution, wherein the account information is a first account information, and wherein the instructions include fourth instructions which are to indirectly interact with a second financial institution to receive second account information for the user from the second financial institution.

5. The mobile device of claim 1, wherein at least some of the instructions are part of a mobile application stored in a memory of the mobile device, and wherein at least some of the instructions are downloaded from a remote device.

6. The mobile device of claim 1, wherein the financial institution is an O-Auth institution.

7. The mobile device of claim 1, wherein scraping of account information involves reading contend displayed on a webpage of the financial institution.

8. The mobile device of claim 4, wherein the second financial institution is a non-O-Auth institution.

9. The mobile device of claim 4, wherein communication between the second financial institution and a server is encrypted.

10. The mobile device of claim 1, wherein scraping of account information involves executing scraping instructions with a standard format that is open for others to contribute.

11. The mobile device of claim 1, wherein scraping of account information includes information comprising account names and balances independent of account number or routing number.

12. A method for secure transaction between a mobile device and a financial institution, the method comprising:

receiving account information for a user directly from the financial institution based at least in part on direct interaction with the financial institution, wherein the mobile device is configured to execute instructions to receive the account information for the user and establish a link with the financial institution, including:

logging, via execution of first instructions, into a web-interface of the financial institution;

extracting, via execution of second instructions, the account information by reading content displayed on the web-interface of the financial institution, wherein the second instructions are downloaded to the mobile device from a remote device and are to extract the account information, wherein the account information includes an account number and a routing number and/or information other than the account information and the routing number, wherein scraping of account information is done directly or locally on the mobile device without involvement of a third-party server, wherein interactions between the mobile device and the financial institution are encrypted, and wherein the mobile device establishes a direct connection with the financial institution by bypassing third-party servers; and sending, via execution of third instructions, the account information to a server;

wherein the first instructions, the second instructions and the third instructions are downloaded to the mobile device from a remote device, wherein the mobile device is used to make payment, or participate or interact in a transaction after the mobile device establishes the link with the financial institution, and wherein the mobile device includes a camera or a biometric sensor to authenticate the user prior to execution of instructions.

13. The method of claim 12, wherein receiving the account information comprises:

gathering one or more login credentials; and providing the one or more login credentials to the financial institution.

14. The method of claim 12, wherein receiving the account information comprises:

downloading the second instructions to the mobile device from the remote device; and extracting information via execution of the second instructions, wherein the information is other than the account number or the routing number.

15. The method of claim 12, wherein receiving the account information further comprises:

downloading the second instructions from the remote device to the mobile device;

extracting, via execution of the second instructions, the account information, wherein the account information includes the account number and the routing number; and sending the account information to a server.

16. The method of claim 12 comprises authenticating the user, via a camera or a biometric sensor.

17. The method of claim 12, wherein the financial institution is a first financial institution, wherein the account information is a first account information, and wherein the method further comprises:

indirectly interacting with a second financial institution to receive second account information for the user from the second financial institution.

18. A non-transitory machine-readable storage media having one or more machine-readable instructions stored therein, that when executed, cause one or more machines to perform a method for secure transaction between a mobile device and a financial institution, and wherein the mobile device is one of the one or more machines, the method by the mobile device comprising:

receiving account information for a user directly from the financial institution based at least in part on direct interaction with the financial institution, wherein the mobile device is configured to execute instructions to receive the account information for the user and establish a link with the financial institution, including:

logging, via execution of first instructions, into a web-interface of the financial institution;

extracting, via execution of second instructions, the account information by reading content displayed on the web-interface of the financial institution, wherein the second instructions are downloaded to the mobile device from a remote device and are to extract the account information, wherein the account information includes an account number and a routing number and/or information other than the account information and the routing number, wherein scraping of account information is done directly or locally on the mobile device without involvement of a third-party server, wherein interactions between the mobile device and the financial institution are encrypted, and wherein the mobile device establishes a direct connection with the financial institution by bypassing third-party servers; and sending, via execution of third instructions, the account information to a server, wherein the first instructions, the second instructions and the third instructions are downloaded to the mobile device from a remote device, wherein the mobile device is used to make payment, or participate or interact in a transaction after the mobile device establishes the link with the financial institution, and wherein the mobile device includes a camera or a biometric sensor to authenticate the user prior to execution of instructions.

* * * * *